Figure 1:
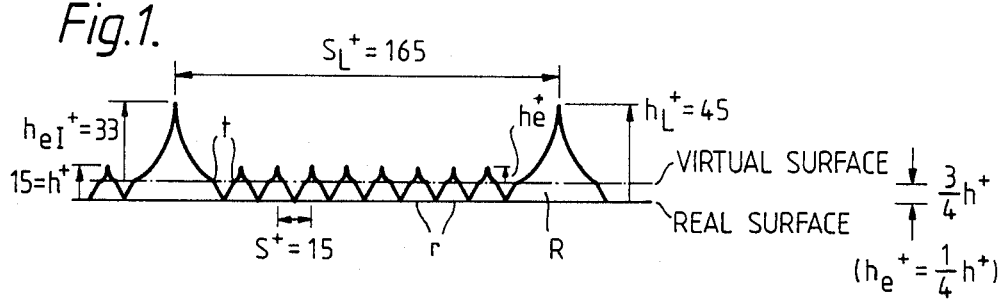

United States Patent [19]

Savill

[11] Patent Number: 4,863,121

[45] Date of Patent: Sep. 5, 1989

[54] BOUNDARY LAYER DEVICES

[75] Inventor: Anthony M. Savill, Cambridge, England

[73] Assignee: Rolls-Royce plc, London, England

[21] Appl. No.: 157,630

[22] Filed: Feb. 19, 1988

[30] Foreign Application Priority Data

Mar. 19, 1987 [GB] United Kingdom ................ 8706554

[51] Int. Cl.$^4$ ............................................. B64C 21/00
[52] U.S. Cl. ..................................... 244/200; 244/130
[58] Field of Search ................ 244/200, 199, 209, 130

[56] References Cited

U.S. PATENT DOCUMENTS

| 4,650,138 | 3/1987 | Grose | 244/200 |
|---|---|---|---|
| 4,706,910 | 11/1987 | Walsh | 244/200 |
| 4,736,912 | 4/1988 | Loebert | 244/200 |

FOREIGN PATENT DOCUMENTS

| 0216384 | 9/1986 | European Pat. Off. | |
| 0205289 | 12/1986 | | |
| 212167 | 3/1987 | European Pat. Off. | 244/200 |
| 244334 | 4/1987 | European Pat. Off. | 244/200 |
| 718498 | 11/1954 | United Kingdom | |
| 2167157 | 5/1986 | United Kingdom | 244/200 |

OTHER PUBLICATIONS

AIAA-83-0230-An Experimental Study of Changes in the Structure of a Turbulent Boundary Layer Due to Surface Geometry Changes; Hooshmand et al., Jan. 1983.
AIAA 12th Aerospace Sciences Meeting-Turbulent Boundary Layer Drag Reduction Using Riblets; Walsh, Jan. 1982.
AIAA 22nd Aerospace Sciences Meeting-Optimization and Application of Riblets for Turbulent Drag Reduction; Walsh et al., Jan. 1984.
ICAS '86-Paper No. 86-1.8.3-Drag Reduction Mechanisms Derived from Shark Skin; Bechert et al.; Sep. 1986.
AIAA'83-AIAA-83-0227, Turbulent Drag Reduction for External Flows, D. M. Bushnell, p. 6, lines 16-64.
Mechanical Engineering, vol. 103, No. 3, Mar. 1981, p. 71, Grooves Reduce Aircraft Drag.
European Search Report 9/87.
NASA Tech. Brief, vol. 5, No. 2, Summer 1980.
NASA TM X-2643; Soderman, Aerodynamic Effects of Leading-Edge Serrations on a Two-Dimensional Airfoil, Sep. 1972, p. 11.

*Primary Examiner*—Galen L. Barefoot
*Attorney, Agent, or Firm*—Cushman, Darby & Cushman

[57] ABSTRACT

An aerodynamic or hydrodynamic surface is provided with so-called "riblets" for reducing drag by modification of the turbulent boundary layer. The riblets comprise flow-aligned elongate projections of small height. In order to increase their effectiveness in reducing drag, just those parts of the riblets which extend above the height of the virtual surface—established by the riblets themselves due to their displacing the turbulent motion away from the real surface—exhibit an abrupt transition to a cusp-shaped profile which more effectively promotes very small scale flow-aligned vortices which drain energy from the larger drag-inducing low speed flow-aligned vortices or "streaks" in the boundary layer.

8 Claims, 1 Drawing Sheet

BOUNDARY LAYER DEVICES

This invention is concerned with the modification of turbulent boundary layer flows over aerodynamic and hydrodynamic surfaces for the reduction of surface drag. It relates particularly to the provision of so-called riblet surfaces in which an array of small longitudinal projections or riblets extends over the turbulent boundary layer regions of a wall surface in the direction of fluid flow over the surface to reduce the surface drag.

Such riblets may be formed, for example, on plastic tape or sheet material which can be adhered to an underlying surface requiring improved drag characteristics, such as an aircraft wing, pipeline wall or marine vessel hull, etc., etc. Alternatively, the riblets may be formed directly in the structural skins of such artifacts. Various methods of forming the riblets are already known, such as machining, moulding, extruding or embossing In respect of metal riblet,, a further possibility is to form riblets by means of electro-deposition onto a master, which could be a vinyl plastic As explained in our earlier patent application Ser. No. 052,867 filed May 22, 1987, an effect of the riblets of earlier experiments is to inhibit the turbulent eddy motions in the boundary layer from penetrating to all parts of the surface, in particular deep into the grooves defined by adjacent riblets, resulting in a displacement of the turbulent motion away from the wall, and thereby a reduction in surface drag. Depending upon their profile, the riblet arrays previously known may also have had some effect in inhibiting the spanwise gradients associated with the formation of the low speed longitudinal vortices or "streaks" that are characteristically formed in a turbulent boundary layer flow close to a wall, and initiating secondary, smaller-scale longitudinal eddies which take energy from the larger scale streaks.

It is also possible, as shown in our earlier patent application, to design an array of projections or riblets so that they not only function in a mainly passive manner, with little influence on the evolution of the eddies themselves, but are also able to exercise some further control of the longitudinal vortices or streaks, which otherwise shift in a random manner transversely across the surface, by constraining them laterally and possible also moving them further apart than their natural spacing This influence is in substance dependent on those portions of the riblets that project into the turbulent motion, i.e. those portions of the riblets that extend above a virtual wall position that the riblets have themselves created by displacing the turbulent motion away from the wall surface.

According to the present invention, an aerodynamic or hydrodynamic wall surface adapted to modify a turbulent fluid flow boundary layer on said surface has said surface provided with a series of elongate projections for alignment with the direction of fluid flow relative to the surface, at least some of the projections having side faces which intermediate their heights have a region at a lesser steepness than adjacent regions above and below said region, each said region of lesser steepness forming the lower part of a concave profile peak on the associated projection.

For best effect the transition to the concave-sided peaks should be positioned at or close to the virtual wall height established by the projections The height position of the virtual wall will vary according to the particular fluid flow regime for which the riblets are designed. The region below the transition preferably has substantially planar faces so as to form a series of steep-sided V-grooves between the projections in their lowest reaches These can act in the manner already described to displace the turbulent motion away from the wall surface. The longitudinal vortices displaced above the virtual wall surface are then controlled by the concave peaks projecting into this region which, by virtue of their different profile, can act more strongly on the vortices.

The transition to the concave profile may be substantially sharp-edged, but it is also possible to have a radiussed or chamfered transition. The concave faces are preferably continuously curved to a relatively sharp-edged tip but it is also possible to build them up from a group of straight and/or curved sections and for convenience the tip itself may be flattened or radiussed.

In our earlier application, an array of projections is provided on a wall surface in which, between each of a series of higher projections there is a plurality of smaller projections. The primary purpose of the smaller projections is to displace the turbulent motion away from the wall, whereas the higher projections are intended to control the lateral location of the longitudinal vortices or streaks of the turbulent region of the boundary layer flow. The displacement produced by the smaller projections can result in reduced wall shear stress, and to the extent that the streaks are weakened thereby they can become more amenable to control. Moreover, the disposition of a number of smaller projections between successive larger projections is able to give a disparity in spanwise scale between the streaks and the smaller projections, as a result of which the higher projections can promote a more rapid energy transfer from the streaks to the small-scale secondary vortices induced by these small projections, and they can produce effects that permeate to the region above the smaller projections and so improve the effectiveness of these projections in that these reduce any activity there. Through their interaction in these senses the higher and smaller projections are able to function in an active manner.

The present invention can be applied with advantage to this arrangement of projections so that at least the higher projections have their side faces formed with a steepness that varies over their height, with a concave peak projecting into the turbulent boundary layer motion. To the extent that at least some of the smaller projections extend above the virtual wall position established by the array, these too preferably have their upper regions similarly profiled. If the smaller projections are of uniform height, they would then all have such profiled faces.

In our earlier application, a wall surface is provided with an array of projections which are disposed in a repeated spanwise pattern in which the adjacent projections of each pattern repeat project to different heights. In the simplest case, this repeated pattern consists of alternating higher and lower projections. In such a configuration both smaller and higher projections can be arranged to displace turbulent eddy motions in the boundary layer away from the wall surface. Whereas the smaller projections by themselves would not be able to establish a virtual surface above the wall surface by more than about three-quarters of their height, the higher projections can be so scaled in relation to the smaller projections that they have the function of extending this effect to its limit.

When employing the present invention in such configurations as these, at least the highest projections of the repeat patterns have a varied inclination of the side faces according to the invention. If the enhanced displacement of the virtual wall surface resulting from the combination of projection heights puts that virtual surface above the height of the smallest projections, no benefit is achieved by modifying their side faces. To the extent that any of the smaller projections extends above the virtual wall position, it is an advantage that their side faces be given a varied inclination similarly, with the transition substantially at the height of the virtual wall position. This may result in a change of inclination occurring at a particular height above the actual wall surface that is the origin of the projections, but in particular cases the pattern or projections may produce a virtual wall surface height that varies spanwise with the projection pattern, and the positions of the changes of inclination on the individual projections can then follow those changes of height.

Our previous patent application also discloses projections having progressively increasing heights with distance along the wall surface in the direction of fluid wall surface in the direction of fluid flow, so as to counter the self-limiting effect of surface drag reduction as the array of projections establishes a virtual wall position at a substantial proportion of the initial height of the projections. In the application of the present invention to this configuration, the projections having a change of steepness intermediate the height of their side faces have that change located at a progressively greater distance above the actual wall surface with distance along the wall surface in the direction of fluid flow.

It is to be understood that these modified forms of the configurations described in our three earlier patent applications can not only be used individually but can also be combined, since the effect of the modifications on these different configurations is complementary.

Figure 3:
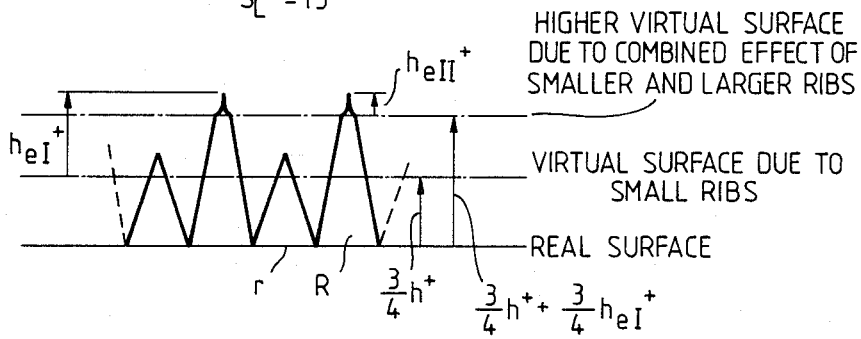
Figure 4:
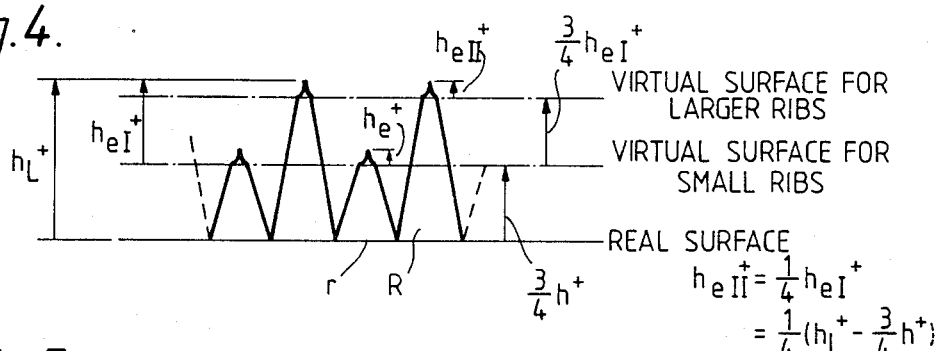
Figure 5:
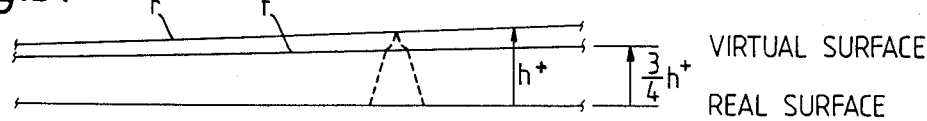

By way of illustration of the invention, reference will be made to the examples shown in the accompanying schematic drawings, wherein:

FIGS. 1 to 4 illustrate respective configurations, according to the invention, of projections or riblets in cross-sectional profile normal to the direction of fluid flow, and FIG. 5 is an illustration of a further projection or riblet configuration according to the invention in side view. FIG. 1 illustrates the application of the present invention to a configuration according to our earlier application U.S. serial number 052,867. It shows riblets with inclined side faces in a pattern in which individual larger riblets R are separated by groups of eight, uniform height, smaller riblets r. In this it is analogous to the example of FIG. 1 of that earlier application. In terms of "wall units" as defined in the earlier application, the smaller riblets r have a non-dimensionalised height $h^+$ of 15 units above the wall surface and are set at a pitch $s^+$ also of 15 units. The larger riblets R have a height $h_L^+$ and width $w^+$ of 45 units, so that their pitch $s_L^+$ is 165 units.

The smaller riblets r establish a virtual surface for the turbulent boundary layer flow some $\frac{3}{4}h^+$ above the wall surface itself and below that level all the riblets have planar inclined side faces. At the level of the virtual surface there is a transition t to a smaller inclination and the riblets continue upwards from that point of inflection with concave side faces to a sharp-peaked tip, in analogy to a concave form of riblet also illustrated in our earlier patent application. Above the virtual wall surface, the larger riblets R have a height ($h_{eI}^+$) of 33 wall units, while the corresponding height ($h_3^+$) of the smaller riblets is about 4 units. The differently profiled regions are adapted to different functions. The regions below the virtual wall surface form the relatively deep V-grooves that are better able to inhibit penetration of turbulent eddy motions, while the concave faces above the virtual wall surface can more effectively promote very small scale longitudinal vortices which drain energy from the larger streaks in the turbulent boundary layer flow. To perform their functions effectively the V-grooves should have a height:width ratio not substantially greater than unity, and the concave faces should form relatively sharp-edged peaks.

Figure 2:
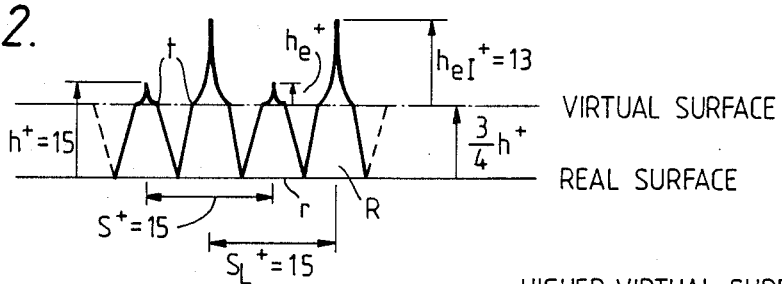

FIG. 2 illustrates the application of the present invention to a further arrangement disclosed in our earlier patent application in which a virtual wall surface is established at the height of the smaller riblets r in a pattern of alternating riblets of two different heights. The pattern pitch is 15 wall units, which is therefore the pitch ($s^+$, $s_L^+$) of smaller and larger riblets. The height of the smaller riblets is 15 wall units and that of the higher riblets R is 25 wall units; above the virtual wall surface they have a height ($h_{eI}^+$) of 13 units for the larger riblets and ($h_e^+$) is about 4 units for the smaller riblets. From the point of transition t the side faces of the riblets extend upwards with the sharp-peaked concave profiles already described while below the virtual wall surface they form steep-sided V-grooves.

If the presence of the larger riblets has the effect of taking the virtual wall surface higher the smaller riblets may lie entirely below the virtual surface. FIG. 3 illustrates a modification of the example in FIG. 2 in which this occurs and it shows that in addition to the $\frac{3}{4}h^+$ displacement of the wall surface produced by the smaller riblets, the larger riblets induce a further displacement of $\frac{3}{4}h_{eI}^+$ so that the virtual wall surface is at a height of ($\frac{3}{4}h^+ + \frac{3}{4}h_{eI}^+$). The height of the smaller riblets being less than this their side faces therefore have a completely planar profile, while side faces of the larger riblets are given their concave form over their effective height +) from the raised virtual wall surface.

It may be found, however, that a riblet pattern in which the height changes between successive riblets produces a similarly undulating virtual wall surface, especially if the pattern consists of more than two riblets. This can be accommodated by a configuration such as is shown in FIG. 4. Here it is assumed that the virtual wall surface height for the smaller riblets r corresponds to that in the example of FIG. 2, whereas for the larger riblets R it corresponds to that in FIG. 3. The point of inflection of the smaller riblets i.e. their intersection with the virtual surface, is at $\frac{3}{4}h^+$ above the real surface, i.e. the base line of the pattern of riblets, and for the larger ribs it is at ($\frac{3}{4}h^+ + \frac{3}{4}h_{eI}^+$) above the real surface. The portion of the smaller riblets having a concave profile thus extends over a height $h_e^+ = \frac{1}{4}h^+$ while the concave profile of the larger riblets extends over a height $\frac{1}{4}(h_L^+ - \frac{3}{4}h^+) = he^+_{II}$. Similar considerations may apply to configurations such as that exemplified in FIG. 1.

Finally FIG. 5 illustrates the application of the present invention to a further arrangement disclosed in our earlier patent application. In this the simple example is taken of a series of riblets which uniformly increase in height $h^+$ along their lengths, with a virtual wall surface at $\frac{3}{4}h^+$. Along the length of the riblets the transition of the upper concave portions occurs at the same $\frac{3}{4}h^+$ value as $h^+$ itself increases with distance along the direction of fluid flow.

Similarly to the examples described in our earlier patent application, the change of height of the point of transition can be arranged stepwise, which may be desirable for ease of production. More generally, the modifications and additional features disclosed for the projections in any of the three earlier patent applications referred to can be used in conjunction with side face configurations according to the present invention.

It will be appreciated that the effects described can be achieved, at least in substance, with modified forms of the inclined side faces shown. In particular, it may be desirable for practical reasons to blunt the points of inflection or the peaks of the riblet faces, while these faces may comprise straight and/or curved portions both below and above the virtual wall surface without unduly changing the general character of the profiles required for the functions described.

Although the above description has focused on achieving improved drag-reduction per se, a further benefit deriving from the use of drag-reducing riblets, achievable by the use of suitable metal, e.g. electrodeposited, riblets on surfaces exposed to fluid-flow, lies in the field of heat exchange technology. This is because improved heat transfer properties should be associated with reductions in drag. Hence, riblets according to the present invention should maximize the heat transfer efficiency of surfaces to which they are applied

I claim:

1. An aerodynamic or hydrodynamic wall surface adapted to modify a turbulent fluid flow boundary layer on said surface, said surface being provided with a series of elongate projections for alignment with the direction of fluid flow relative to said surface, at least some of said projections having side faces which intermediate their heights have a region at a lesser steepness than adjacent regions above and below said region, each said region of lesser steepness forming a lower part of a concave profile peak on an associated projection, wherein said adjacent region below said region of lesser steepness has a transition to said region of lesser steepness near a virtual wall height position, said virtual wall height position being determined for a predetermined fluid flow regime, by displacement of the boundary layer turbulent flow away from said wall surface by said projections;

each concave profile peak on an associated projection having a height greater than about three and three quarter wall units above said transition.

2. A wall surface according to claim 1 wherein said series of projections comprise a plurality of higher projections between successive ones of which there is a plurality of lower projections, at least said higher projections having said concave profile peaks extending from said regions of lesser steepness.

3. A wall surface according to claim 1 wherein said projections are disposed in a repeated spanwise pattern in which adjacent projections of said pattern project to different heights, at least the highest projections having said concave profile peaks extending from said regions of lesser steepness.

4. A wall surface according to claim 2 or claim 3 wherein there are both higher and lower projections with said concave profile peaks extending from said regions of lesser steepness.

5. A wall surface according to claim 4 wherein said regions of lesser steepness are disposed at heights above said wall surface which differ in dependence upon the heights of said associated projections.

6. A wall surface according to claim 4 wherein projections of different heights have said regions of lesser steepness disposed at a common height.

7. An aerodynamic or hydrodynamic wall surface adapted to modify a turbulent fluid flow boundary layer on said surface, said surface being provided with a series of elongate projections for alignment with the direction of fluid flow relative to said surface, at least some of said projections having side faces which intermediate their heights have a region at a lesser steepness than adjacent regions above and below said region, each said region of lesser steepness forming a lower part of a concave profile peak on an associated projection, wherein said adjacent region below said region of lesser steepness has a transition to said region of lesser steepness near a virtual wall height position, said virtual wall height position being determined for a predetermined fluid flow regime, by displacement of the boundary layer turbulent flow away from said wall surface by said projections;

said regions of lesser steepness of said projections being located at a height above said wall surface that increases with distance along said projections in said direction of fluid flow.

8. An aerodynamic or hydrodynamic wall surface adapted to modify a turbulent fluid flow boundary layer on said surface, said surface being provided with a series of elongate projections for alignment with the direction of fluid flow relative to said surface, at least some of said projections having side faces which intermediate their heights have a region at a lesser steepness than adjacent regions above and below said region, each said region of lesser steepness forming a lower part of a concave profile peak on an associated projection, each said concave profile peak having a height on an associated projection greater than about three and three quarter wall units.

* * * * *